(12) United States Patent  
Watling

(10) Patent No.: US 10,964,064 B1  
(45) Date of Patent: Mar. 30, 2021

(54) SEASONAL COLOR CODING SYSTEMS AND METHODS

(71) Applicant: Kimberly M. Watling, Holland, MI (US)

(72) Inventor: Kimberly M. Watling, Holland, MI (US)

( * ) Notice: Subject to any disclaimer, the term of this patent is extended or adjusted under 35 U.S.C. 154(b) by 58 days.

(21) Appl. No.: 16/661,983

(22) Filed: Oct. 23, 2019

(51) Int. Cl.
| | |
|---|---|
| G06K 9/00 | (2006.01) |
| G06T 7/90 | (2017.01) |
| G06F 16/583 | (2019.01) |
| H04N 1/50 | (2006.01) |
| H04N 1/64 | (2006.01) |
| G06Q 30/06 | (2012.01) |

(52) U.S. Cl.
CPC ............ *G06T 7/90* (2017.01); *G06F 16/5838* (2019.01); *G06Q 30/0631* (2013.01); *H04N 1/506* (2013.01); *H04N 1/64* (2013.01)

(58) Field of Classification Search
CPC .... H04N 9/646; H04N 9/0451; H04N 17/002; H04N 17/02; H04N 19/00024; H04N 19/00139; H04N 19/00315; H04N 19/00448; H04N 1/40012; H04N 1/40018; H04N 1/40025; H04N 1/40031; H04N 1/40037; H04N 1/40043; H04N 1/4005; H04N 1/40056; H04N 1/40062; H04N 1/40068; H04N 1/40075; H04N 1/64; H04N 1/506; G06T 3/0062; G06T 3/40; G06T 3/4007; G06T 2207/20; G06T 3/00; G06T 3/0018; G06T 3/0031; G06T 3/0006; G06T 7/90; G06F 16/5838; G06Q 30/0631
USPC ........................................................ 382/162
See application file for complete search history.

(56) References Cited

U.S. PATENT DOCUMENTS

| | | | |
|---|---|---|---|
| 2015/0363945 A1* | 12/2015 | Atsmon | G06K 9/4652 382/162 |
| 2016/0026926 A1* | 1/2016 | Yeung | G06Q 30/0269 706/12 |
| 2017/0270679 A1* | 9/2017 | Koven | G01J 3/0264 |

* cited by examiner

*Primary Examiner* — Duy M Dang
(74) *Attorney, Agent, or Firm* — R. William Graham

(57) ABSTRACT

A seasonal color coding system for recommending a customized seasonal color harmony palette to a user is disclosed. The system includes a scanning module to scan attributes comprising a skin color, a hair color, and an eye color, a plurality of colors of tangible objects, or a combination thereof associated with a plurality of users. The system further includes an analysis module to analyze the plurality of attributes by using mathematical algorithms to identify colors corresponding to each of the attributes. The system further includes a categorization module to determine a category for the user based on the identified colors corresponding to each of the attributes. The system further includes a recommendation module to provide recommendations for the customized seasonal color harmony palette to the user based on the determined category.

20 Claims, 7 Drawing Sheets

SEASONAL COLOR CODING SYSTEMS AND METHODS

BACKGROUND

Field of Invention

Embodiments of the present invention generally relate to a system and method to generate a customized seasonal color harmony palette for a user and particularly to a system and method for automatically generating and recommending a customized seasonal color harmony palette to complement existing coloring of the user and/or an inventory associated with the user.

Description of Related Art

Colors are an important part of every industry and therefore, seasonal color harmony and analysis are important tools wherein color identification and color harmonies are needed. Appropriate color selection form a color palette in various industries such as, but not limited to, fashion, jewelry, beauty, home products, arts, commerce, and so forth. The appropriate color selection and other personal characteristics of a user can have a very good impact on the user's social interactions, personal and professional achievements, physical and mental health, and various other aspects of life, while improving personal appearance of the user. On the contrary, inappropriate color combinations can affect many aspects of the user's well-being and success. Therefore, it is important for the user to select harmonious colors and combinations for a better lifestyle.

In the currently available color analysis systems, a color is measured along three axis in a color space, such as, Hue, Saturation, Brightness (HSB), a combination of Red, Green, Blue (RGB) additive colors, a combination of Cyan, Magenta, Yellow, and Black (CMYK), and so forth. However, such currently available color analysis systems provide a route for estimating a mixture of additive colors, but do not provide any mathematical formula for mixing subtractive colors that are necessary to stimulate a mixture of pigments. For example, using image editing software, there is no known method to mix any two colors of the spectrum in any of the color spaces using the conventional color analysis systems. Also, a blending mode, and a level of opacity may work for one set of colors to simulate a real-world pigmentation for a color space but the same solution may produce an unexpected results for another set of colors. Therefore, these color spaces cannot be used as a mathematical model for blending subtractive colors, or predicting how a real-world pigment may react with human pigmentation.

Further, conventional color analysis systems create purely match to color systems for harmonious seasonal colors and their combinations based on users' attributes, but have various shortcomings. These conventional color analysis systems are prone to errors introduced by a color analyst's subjectivity, which further results in inaccurate harmonious color recommendations to the users. The difficulty of creating a scientific and mathematical equation to define harmonious seasonal color for each user is based on an accurate color system for mixing and combining real-world pigment, which is still not yet available. However, creating an accurate color analysis system for mixing a subtractive color is much more complex and has eluded, yet enticed scientists and researchers for centuries.

One conventional color system to simulate the mixture of subtractive color is the Kubelka-Munk system that measures a real-world pigment along at least six axis, including the properties of reflectance LRV—Light Reflectance Value, absorption and diffusion that are unique to real-world pigments. This color system is altered to produce a more accurate color system, but the approaches to color assessment also result in inaccurate harmonious color recommendations.

There is thus a need for a system and method for providing efficient seasonal color recommendations, uniquely compatible with the existing coloring of a user in which seasonal formulas and automated expertise may be applied to create a customized seasonal color harmony palette.

SUMMARY

Embodiments in accordance with the present invention provide a seasonal color coding system for recommending at least one customized color palette to at least one user. The seasonal color coding system includes a scanning module configured to scan a plurality of attributes comprising a skin color, a hair color, and an eye color, a plurality of colors of one or more tangible objects, or a combination thereof, associated with the at least one user. The seasonal color coding system further includes one or more databases configured to store the plurality of scanned attributes associated with the at least one user. The seasonal color coding system further includes an analysis module configured to analyze the plurality of attributes by using one or more mathematical algorithms to identify one or more colors from a color palette corresponding to each of the plurality of the attributes, wherein the identification of one or more colors comprising: comparing the color of the plurality of scanned attributes with the color palette stored in the one or more databases; selecting the one or more colors from the one or more databases based on the comparison, wherein the one or more databases are updated when a new color is identified. The seasonal color coding system further includes a categorization module configured to determine at least one category for the at least one user based on the identification of the one or more colors corresponding to each of the plurality of the attributes. The seasonal color coding system further includes a recommendation module configured to provide one or more recommendations for the at least one customized color palette to the at least one user based on the determined category. The seasonal color coding system further includes a display module configured to display the customized color palette to the at least one user.

Embodiments in accordance with the present invention further provide a computer-implemented method for recommending at least one customized color palette to at least one user. The method includes scanning a plurality of attributes comprising a skin color, a hair color, and an eye color, a plurality of colors of one or more tangible objects, or a combination thereof associated with the at least one user; storing the plurality of scanned attributes associated with the at least one user; analyzing the plurality of attributes by using one or more mathematical algorithms to identify one or more colors from a color palette corresponding to each of the plurality of the attributes, wherein the identification of one or more colors comprising comparing the colors of the plurality of scanned attributes with the color palette stored in the one or more databases; selecting the one or more colors from the one or more databases based on the comparison, wherein the one or more databases are updated when a new color is identified; determining at least one category for the at least one user based on the identification of the one or more colors corresponding to each of the plurality of the attributes; providing one or more recommendations for the at least one customized color palette to the at least one user based on the determined category; and displaying the customized color palette to the at least one user.

Embodiments in accordance with the present invention further provide a computer-implemented method for recommending at least one customized color palette to at least one user. The method includes scanning a plurality of attributes comprising a skin color, a hair color, and an eye color, a plurality of colors of one or more tangible objects, or a combination thereof associated with the at least one user; store the plurality of scanned attributes associated with the at least one user; analyzing the plurality of attributes by using one or more mathematical algorithms to identify one or more colors from a color palette corresponding to each of the plurality of the attributes, wherein the identification of one or more colors comprising comparing the color of the plurality of scanned attributes with the colors stored in the one or more databases; selecting the one or more colors from the one or more databases based on the comparison, wherein the one or more databases are updated when a new color is identified based on at least one of a RGB value, a CMYK value, a HSV, or a combination thereof; determining at least one category for the at least one user based on the identification of the one or more colors corresponding to each of the plurality of the attributes; providing one or more recommendations for the at least one customized color palette to the at least one user based on the determined category; and displaying the customized color palette to the at least one user.

Embodiments of the present invention may provide a number of advantages depending on its particular configuration. First, embodiments of the present application provide a system and a method for evolution of a digitized color library using artificial intelligence. Next, embodiments of the present application provide a customized color palette harmonious to a user based on attributes associated with the user.

Next, embodiments of the present application may provide recommendations for a color palette to the user based on attributes of the user. The color palette may include a seasonal palette of colors to determine a best buying choice for the user. Next, embodiments of the present application may enable users to use the color coding system as a hand-held color meter to color match while shopping to determine a best buying choice for their seasonal colors, and/or multi-season colors.

Next, embodiments of the present application may enable vendors to manage their inventory based on colors, and color harmonies for their customers. The vendors may use the color coding system as a color meter for their inventory management systems. The embodiments of the present application may improve a vendor customer service by providing ability to their customers to buy from any collection, any color using the color coding system based on their seasonally scanned objects.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1:
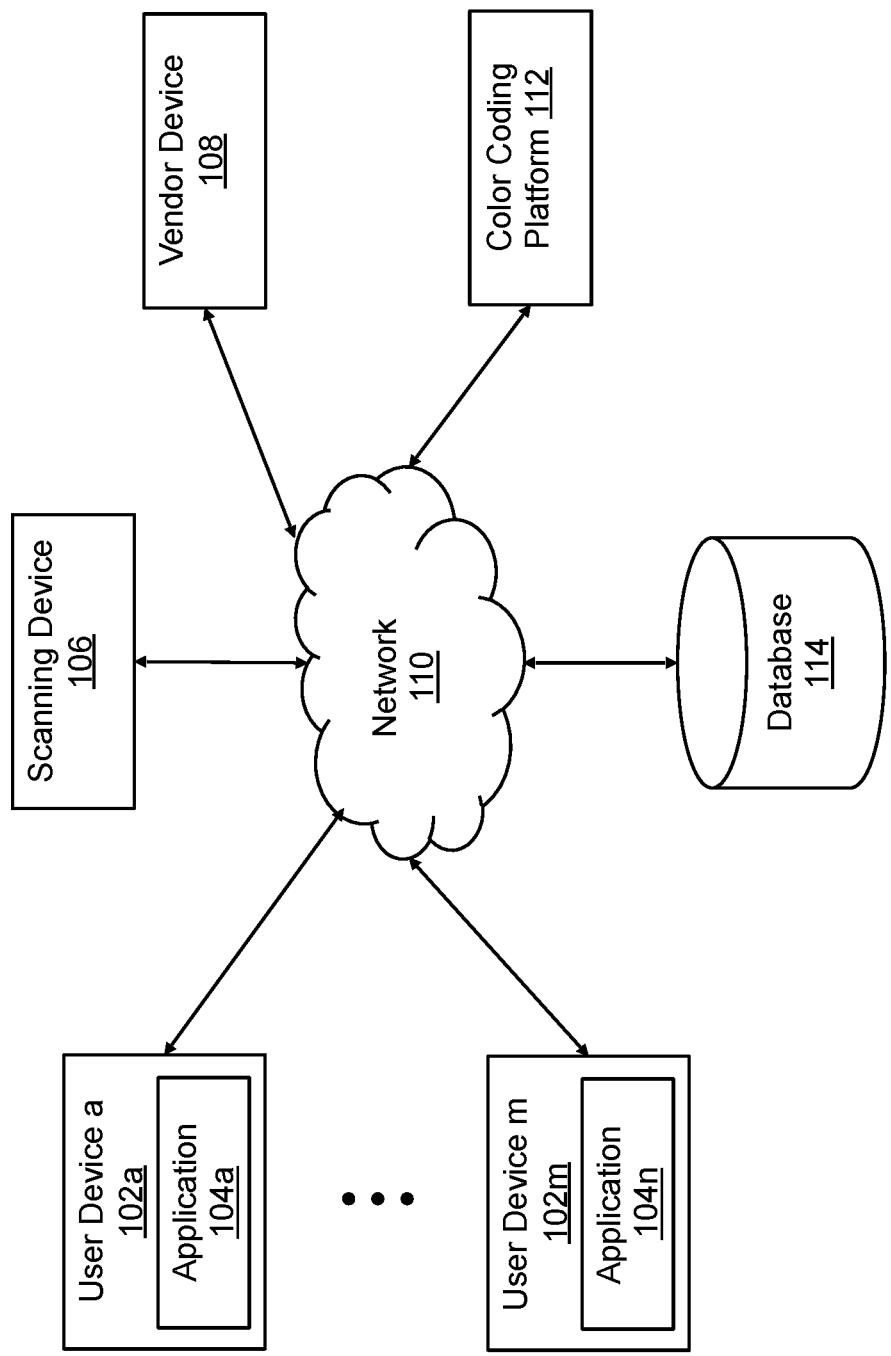
FIG. 1 illustrates a block diagram depicting a seasonal color coding system, according to an embodiment of the present invention.

While embodiments of the present invention are described herein by way of example using several illustrative drawings, those skilled in the art will recognize the present invention is not limited to the embodiments or drawings described. It should be understood the drawings and the detailed description thereto are not intended to limit the present invention to the particular form disclosed, but to the contrary, the present invention is to cover all modification, equivalents and alternatives falling within the spirit and scope of embodiments of the present invention as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together, and may be used or in future new elements may be added, replaced by using for example D, E, F, or Z.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The terms "RGB", and variations thereof, as used herein, are used interchangeably and include any type of an additive color system where primary colors are, red, green, and blue.

The terms "CMY", "CMYK", and variations thereof, as used herein, are used interchangeably and include any type of a subtractive color model where cyan, magenta, yellow, and black inks can be mixed to produce any color.

The terms "hue, saturation, value", "HSV", and variations thereof, as used herein, are used intermingled and interchangeably as an alternative and/or additional representation of the RGB color model. This color model describes colors such as, but not limited to, tint or hue in terms of their shades for example, saturation, mutation or amount of gray or other tone, and their clarity and/or brightness value.

Embodiments in accordance with the present invention provide a customized season color harmony coding system (herein after referred to as color coding system 100) for providing recommendations for a customized season color harmony palette to users based on their attributes. Further, the embodiments in accordance with the present invention provide a seasonal color coding system for creating a new seasonal color global digital color system.

FIG. 1 illustrates a block diagram depicting a seasonal color coding system 100 (hereinafter referred to as "a color coding system 100"), according to an embodiment of the present invention. The color coding system 100 may provide recommendations for a seasonal color palette to a user based on attributes associated with the user.

The color coding system 100 may include a plurality of user devices 102a-m (hereinafter referred to as "a user device 102"). The user device 102 may be, but is not limited to, a mobile device, a smart phone, a tablet computer, a portable computer, a laptop computer, and so forth. Embodiments are intended to include or otherwise cover any type of a user device 102, including known, related art, and/or later developed technologies. Each of the user device 102 comprises a camera (not shown) or compatible scanning device in order to collect data from the user. The user may be a consumer who desires for a recommendation for a customize color palette. Further, the user device 102 may include one or more software applications such as, but is not restricted to, an ecommerce application, a navigation application, a camera application, a media player application, a social networking application, and the like. In an embodiment of the present invention, the user device 102 may include a proprietary color coding application 104a-n (hereinafter referred to as "a color coding application 104"). A user may access the color coding application 104 by using log-in credentials, in an embodiment of the present invention. The user may first register with a service provider of the color coding application 104, and then a user profile is created. In an embodiment of the present invention, the color coding application 104 may be a software application that is registered with a color coding platform 112.

Further, the color coding system 100 may include a scanning device 106. In an embodiment of the present invention, the scanning device 106 may be any device that is capable of scanning any color sample from a number of resources for determining one or more colors. The scanning device 106 may detect color by its response to a particular light source that illuminates an area of a sample and, therefore, may avoid any inaccuracies during color detection due to variations in ambient lighting conditions. In an embodiment of the present invention, the scanning device 106 may be any software application installed in a user device 102, and/or a vendor device 108 that is available for scanning color samples. In another embodiment of the present invention, the scanning device 106 may be, but not limited to, a digital camera, a colorimeter, a spectrophotometer, a mobile device, a smart phone, a tablet computer, a portable computer, a laptop computer, and so forth. Embodiments are intended to include or otherwise cover any type of scanning device 106, including known, related art, and/or later developed technologies, which may be beneficial to determine colors from color samples. The resources may include, but not limited to, printable media (e.g., seasonal color charts), books, academy training manuals, digital formats, presentations, software applications and websites, advertisings, marketing, swatches and/or color palettes from various industries, images, videos, cinematographs, and so forth. The scanning device 106 may further be configured to scan attributes of tangible objects associated with a user, in an embodiment of the present invention. The attributes of the user may include physical attributes such as, but not limited to, an eye color, a hair color, and a skin tone (e.g., undertone, overtone, etc.), and so forth, in an embodiment of the present invention. Examples of the tangible objects may include, but not limited to, clothes, accessories, shoes, books, images, videos, wall paints, and so forth.

The color coding system 100 may further include a vendor device 108 that may use the color application 104 to manage its inventory of objects by adding a seasonal color to each of the objects within the inventory, in an embodiment of the present invention. In another embodiment of the present invention, the vendor device 108 may use the color application 104 to provide recommendations for customized color palettes to the consumers. The vendor device 108 may work in conjunction with the scanning device 106 to scan attributes and/or tangible objects, in an embodiment of the present invention. In another embodiment of the present invention, the vendor device 108 may include a scanning device 106 to scan the attributes and/or tangible objects.

Further, the color application 104 may be managed by a color coding platform 112, in an embodiment of the present invention. The working of the color coding platform 112 is described in detail in conjunction with FIG. 2. In an embodiment of the present invention, the color coding platform 112 may be a software application stored in a server (not shown). In another embodiment of the present invention, the color coding platform 112 may be implemented as a hardware, a firmware, a software, or a combination thereof managed by a third-party service provider.

The color coding system 100 may further comprises a database 114, in an embodiment of the present invention.

The database 114 may store the data associated with the devices such as, but not limited to, the user device 102, the scanning device 106, the vendor device 108, the color coding platform 112, and so forth. However, only one database is shown in the FIG. 1, it is to be contemplated that more than one database may also be used to store the data.

The communication between the user device 102, the scanning device 106, the vendor device 108, the color coding platform 112, the database 114, and so forth may be done through a communication network 110. The communication network 110 may include a data network such as, but not restricted to, the Internet, Local Area Network (LAN), Wide Area Network (WAN), Metropolitan Area Network (MAN), etc. In certain embodiments of the present invention, the communication network 110 may include a wireless network, such as, but not restricted to, a cellular network and may employ various technologies including Enhanced Data Rates For Global Evolution (EDGE), General Packet Radio Service (GPRS), Global System For Mobile Communications (GSM), Internet Protocol Multimedia Subsystem (IMS), Universal Mobile Telecommunications System (UMTS) etc. In some embodiments of the present invention, the communication network 110 may include or otherwise cover networks or sub-networks, each of which may include, for example, a wired or wireless data pathway. The communication network 110 may include a circuit-switched voice network, a packet-switched data network, or any other network capable for carrying electronic communications. For example, the communication network 110 may include networks based on the Internet Protocol (IP) or Asynchronous Transfer Mode (ATM), and may support voice usage, for example, VoIP, Voice-over-ATM, or other comparable protocols used for voice data communications.

Examples of the communication network 110 may further include, but are not limited to, a Personal Area Network (PAN), a Storage Area Network (SAN), a Home Area Network (HAN), a Campus Area Network (CAN), a Local Area Network (LAN), a Wide Area Network (WAN), a Metropolitan Area Network (MAN), a Virtual Private Network (VPN), an Enterprise Private Network (EPN), the Internet, a Global Area Network (GAN), and so forth. Embodiments are intended to include or otherwise cover any type of communication network, including known, related art, and/or later developed technologies to connect the components of the color coding system 100 with each other.

Figure 2:
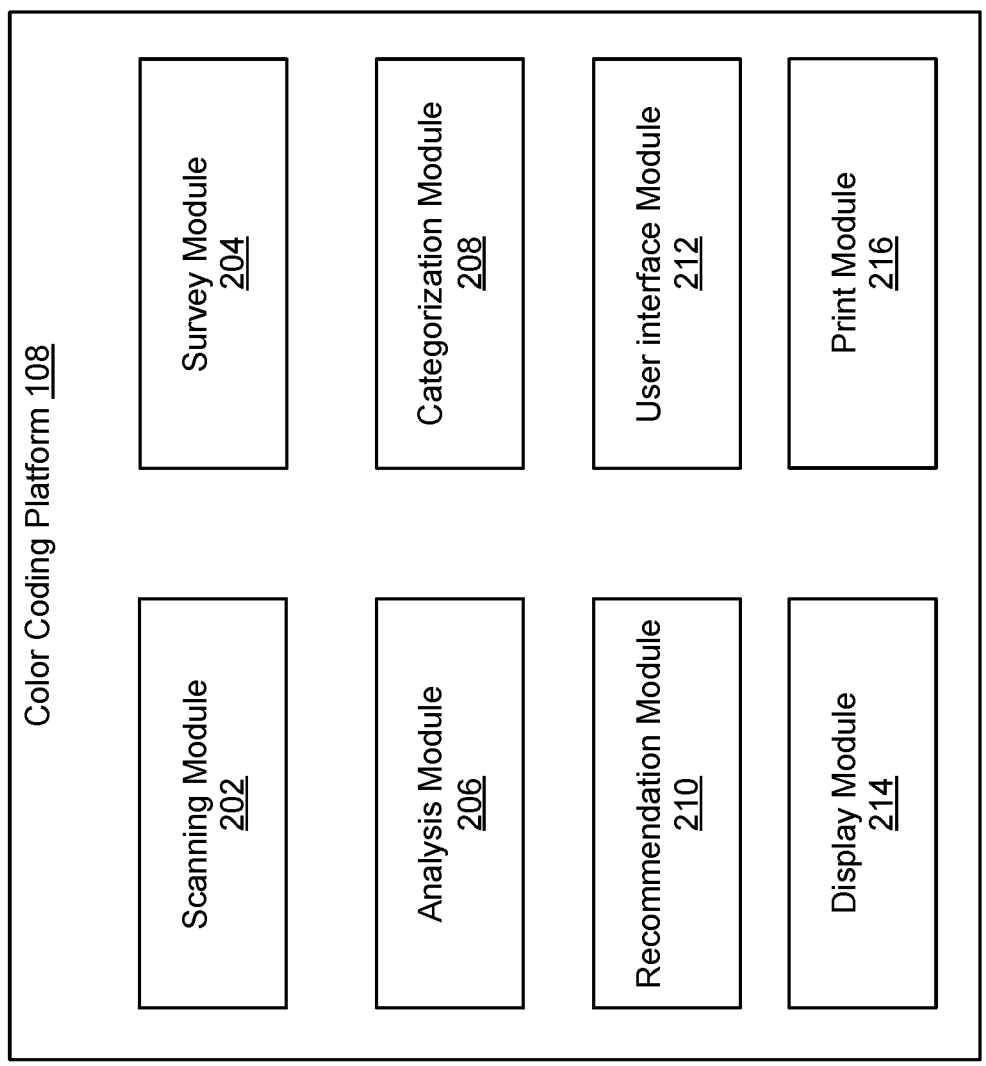
FIG. 2 illustrates a functional block diagram of a color coding platform, according to an embodiment of the present invention.

FIG. 2 illustrates a functional block diagram of the color coding platform 112, according to an embodiment of the present invention. The color coding platform 112 may include, but not limited to, a scanning module 202, a survey module 204, an analysis module 206, a categorization module 208, a recommendation module 210, a user interface module 212, a display module 214, and a print module 216.

The scanning module 202 may be configured to scan a plurality of attributes from various resources. As discussed above, the resources may include, but not limited to, printable media (e.g., seasonal color charts), books, academy training manuals, digital formats, presentations, software applications and websites, advertisings, marketing, swatches and/or color palettes from various industries, images, videos, cinematographs, and so forth. In another embodiment of the present invention, the scanning module 202 may further be configured to scan attributes of a user. The attributes of the user may include physical attributes such as, but not limited to, an eye color, a hair color, and a skin tone (e.g., undertone, overtone, etc.), and so forth. The scanning module 202 may be configured to scan multiple parts of a body to scan the skin tone, which may include, but not limited to, head shot, forehead, under chin, cheek, inner arm such as forearm and so forth. In yet another embodiment of the present invention, the scanning module 202 may be configured to scan attributes of tangible objects associated with the user, which may include, but not limited to, clothes, accessories, shoes, cosmetics, beauty products, books, images, videos, and so forth. The scanned data associated with the user may be stored in a database, such as the database 114 for further processing.

The scanning module 202 may further be configured to scan a plurality of tangible objects associated with a vendor. The tangible objects may include, but not limited to, cosmetics or beauty products, clothes, fabrics, textiles, accessories, jewelry, home products such as, but not limited to, paints, design, crafts, print, etc., books, and so forth. The scanned data of the tangible objects may be stored in a database, such as the database 114 to manage the inventory associated with the vendor.

The survey module 204 may be configured to conduct a survey from the user, in an embodiment of the present invention. The survey may include a plurality of questionnaire associated with the user, which may include, but not limited to, a favorite color, a favorite season, a color preference in items, a color of eyes, preferred clothes, accessories, and so forth. The surveyed data may then be stored in a database, such as, but not limited to, the database 114.

The analysis module 206 may be configured to analyze the scanned data, in an embodiment of the present invention. The analysis module 206 may be configured to analyze the scanned colors and measure values of each of the scanned colors in terms of colors are rendered in a particular media, which currently include at least one of a RGB value, a CMYK value, a HSV, and can include a new future systems or a combination thereof, but not limited to, RGB, CMYK, HSV, any other new measurements, and so forth. The analysis module 206 may be configured to measure values of colors based on, but not limited to, Red (RGB) %, Green (RGB) %, Blue (RGB) %, Hue (HSL/HSV) degree, Saturation (HSL) %, Light (HSL) %, Saturation (HSV) %, Value (HSV) %, Chroma, brightness, reflection, absorption, diffusion, and so forth. Further, the analysis module 206 may be configured to generate a data file that comprises measured values of each of the scanned colors.

Furthermore, the analysis module 206 may be configured to assign a hexadecimal value to each of the scanned colors according to a hex color code scheme. The hex color code is a way of representing a color using hexadecimal values. The hex color code is a hex triplet that represents three separate values of the component colors. The hex color code starts with a hash sign (#) and is followed by six hex values or three hex value pairs (for example, #AEF645). As such, the hex value pairs refer to the RGB color space. The hex color code may describe the composition of a particular color in a color space, such as RGB, CMYK and HSV. Embodiments of the present invention are intended to include or otherwise cover any other such color scheme, including known, related art, and/or later developed technologies that may be beneficial to assign a value to a corresponding color.

In an embodiment of the present invention, the analysis module 206 may be configured to assign a label to each of the scanned colors. The label may be assigned in a format, for example, "Name, Index, Label 1 physical set of fabric color", "Name, Index, Label 1 physical set of eye color", "Name, Index, Label 1 physical set of human hair color", and so forth.

The analysis module 206 may further be configured to create a value scale table for each of the scanned colors within hue. The value scale table may be created based on the measured values of the RGB, CMYK, etc., hexadecimal value, and an assigned label. In an exemplary scenario, a first value scale table is created for shades of red, a second value scale table is created for a shade of blue, and so forth. These value scale tables are then stored in a database, such as the database 114 and, therefore, a digital library of colors is created. In an embodiment of the present invention, while creating the digital color library, some of the spaces in the value scale tables are left unfilled for the purpose of adding new colors in future related to a same shade and/or tone.

Further, the analysis module 206 may be configured to analyze the scanned attributes of the user in order to identify a skin color, a hair color and an eye color of the user. The hair color may range from dark color such as, but not limited to, from black to deep ash brown, or light color such as, but not limited to, silver-blonde, and so forth. The eye color may range from black, soft dark brown, light brown, gray, blue, green, and so forth. The skin color may vary from, but not limited to, cool blue tones, warm yellow tones, ivory, milky, golden, and so forth.

Further, by using mathematical algorithms, the analysis module 206 may further be configured to identify colors based on each of the attributes of the user. The mathematical algorithms may include, but not limited to, fuzzy logic, artificial intelligence, and so forth. Embodiments of the present invention are intended to include or otherwise cover any mathematical algorithm, including known, related art, and/or later developed technologies, which may be beneficial to identify colors based on each of the attributes associated with the user.

The analysis module 206 may be configured to identify the colors by comparing the scanned color of the attributes with the pre-stored color palettes in the database, such as the database 114. Based on the comparison, colors from the color palettes matching the scanned colors of the attributes may be selected by the analysis module 206. In an embodiment of the present invention, when a new color is identified by the analysis module 206 based on the measured values of the RGB, CMYK, and so forth, then a new label is assigned to the new color and is then added to the unfilled spaces within the value scale table associated with the identified color. The value scale table is then updated and stored in the database, such as the database 114.

The analysis module 206 may further be configured to analyze colors from images or videos that are provided by the user. Based on the color analysis, the analysis module 206 may then identify colors in the images and videos using the pre-stored color palettes and/or by using mathematical algorithms, within the database, such as the database 114.

The categorization module 208 may be configured to determine a category for the user. In an embodiment of the present invention, the categorization module 208 may determine a category based on the identified colors corresponding to the scanned attributes of the user. The category may include, for example, but not limited to, a season, a seasonal color, seasonal categories, or a combination thereof. The categorization module 208 may first be configured to determine a seasonal undertone color temperature for the user. The seasonal undertone color temperature may be categorized into warm or cool undertone. Skin color having an extra measure of yellow may tend to be associated with warmth, the sun, fire, lava, harvest fields and the like, and therefore, be categorized into a warm undertone. On the contrary, skin color having an extra measure of blue may tend to be associated with objects that are cold, for example, but not limited to, night sky, deep sea, mineral/rock, and so forth, and may therefore, be categorized into a cool undertone.

Further, the categorization module 208 may be configured to determine a season for the user based on the determined seasonal undertone color temperature, in an embodiment of the present invention. In case, the user is associated with a warm undertone, then the user may belong to one of a season i.e., either a spring season or an autumn season. On the other hand, in case, the user is associated with a cool undertone, then the user may belong either to a summer season or a winter season. The categorization module 208 may further be configured to provide a variety and/or sub-variety of a spring season may include, but not limited to, early, shining, mellow, vital, floral, golden, glorious, pastel, striking, glass, petal, and so forth. The variety and/or sub-variety of summer season may include, but not limited to, golden, iridescent, rosy, twilight, moonlight, dusky, sunshine, Indian, rose, flannel, cotton, dreamy, and so forth. The variety and/or sub-variety of autumn season may include, but not limited to, amber, subtle, tawny, burnished, mellow, metallic, bronze, suede, leather, velvet, low light, and so forth. The variety and/or sub-variety of winter season may include, but not limited to, dynamic, classic, gentle, exotic, sunset, firelight, snow frost, jewel-toned, ceramic, vinyl, silicone, contrast, and so forth.

The categorization module 208 may further be configured to determine a category for a scanned object at a vendor's store, in an embodiment of the present invention. The categorization module 208 may designate a seasonal color code and/or a season to the scanned objects while managing the inventory of the vendor when new objects are scanned and stored in the inventory. The object may be of any brand or color.

Further, the categorization module 208 may be configured to determine a season based on the analysis of the images and may provide a template comprising colors that are present within the images.

Further, based on the above seasons and categories, the categorization module 208 may be configured to categorize the scanned colors and store the categorized colors in the database, such as the database 114.

The recommendation module 210 may be configured to provide recommendations to the user. The recommendation module 210 may recommend a customized color palette to the user based on the determined category, in an embodiment of the present invention. In an exemplary scenario, if a first user belongs to a cool undertone and a winter season, then the recommendation module 210 may recommend a customized color palette that may include shades of Winter's Personal Palette: gray, black, purple, white, turquoise, and so forth. On the contrary, if a second user belongs to a cool undertone and a summer season, then the recommendation module 210 may recommend a customized color Summer Personal Palette that may include shades of lavender, soft white, raspberry, navy, aqua, and so forth.

In another embodiment of the present invention, the recommendation module 210 may further be configured to recommend one or more web addresses for one or more shopping websites from where the user may purchase desired clothes or accessories, and so forth based on the determined category or a palette of colors recommended to the user.

In yet another embodiment of the present invention, the recommendation module 210 may be configured to provide recommendations to a user about an object from the user's inventory. In an exemplary scenario, a user desires to wear a dress for a party, then the recommendation module 210 may provide recommendations about a black dress or a red dress stored in the inventory of the user based on the user's determined category. In another exemplary scenario, the recommendation module 210 may provide recommendations to a vendor to display a particular blue fabric to a customer having a cool undertone and a winter season.

The recommendation module 210 may further be configured to provide images that are stored in the database, such as the database 114 based on the palettes of colors recommended to the user.

The recommendation module 210 may further be configured to provide information or inspiring messages to the user to let the user know which color may work best. In an exemplary scenario, the recommendation module 210 may provide a message "Perfect Spring Color! You will look terrific in this." when a user picks a dress from the user's inventory, or "better colors exist which will help you look your best. Recommend you continue shopping and let this one go." when the user is shopping at a vendor's store.

The user interface module 212 may be configured to provide a user interface of the color application 104 on the user device 102 and/or the vendor device 108. The user and/or the vendor may install and/or connect to the color application 104 on their respective user device 102 and/or the vendor device 108. The user and/or the vendor may create an account on the color application 104 that is managed by the color coding platform 112 in order to receive recommendations about customized color palettes. In an embodiment of the present invention, the user interface module 212 may function in conjunction with the scanning module 202, the survey module 204, in order to receive data from the user and/or the vendor. The data may include, but not limited to, a name, an age, a contact information, an email address, color preferences, and so forth.

Further, the user interface module 212 may be configured to display a log-in user interface of the color application 104 on the user device 102 and/or the vendor device 108. The user and/or vendor may log-in the color application 104 by using log-in credentials, such as, but not limited to, a sign-in ID and a password, and/or a biometric, for example, a fingerprint, a face recognition, etc. Embodiments of the present invention are intended to include or otherwise cover any type of data, including known, related art, and/or later developed technologies to securely log-in into the color application 104.

The display module 214 may be configured to display the customized color palette to the user. The display module 214 may function in conjunction with the user interface module 212 in order to display the customized color palette on the user device 102 and/or the vendor device 108. In an embodiment of the present invention, the display module 214 may be configured to display the customized color palette in, but not limited to, a single color, a plurality of colors, a tabular form, a collage, and so forth. The display module 214 may be configured to display the color palette in a template as selected by the user, in an embodiment of the present invention. In another embodiment of the present invention, the user interface module 212 may be configured to display an image of an object recommended by the recommendation module 210, which is stored in the user's and/or vendor's inventory. In yet another embodiment of the present invention, the display module 214 may be configured to display the inspiring messages recommended by the recommendation module 210.

The print module 216 may be configured to print the recommended customized palette for the user. The printed customized color palette may then be provided to the user for perfect color matching and purchasing of desired objects based on the determined category.

Figure 3:
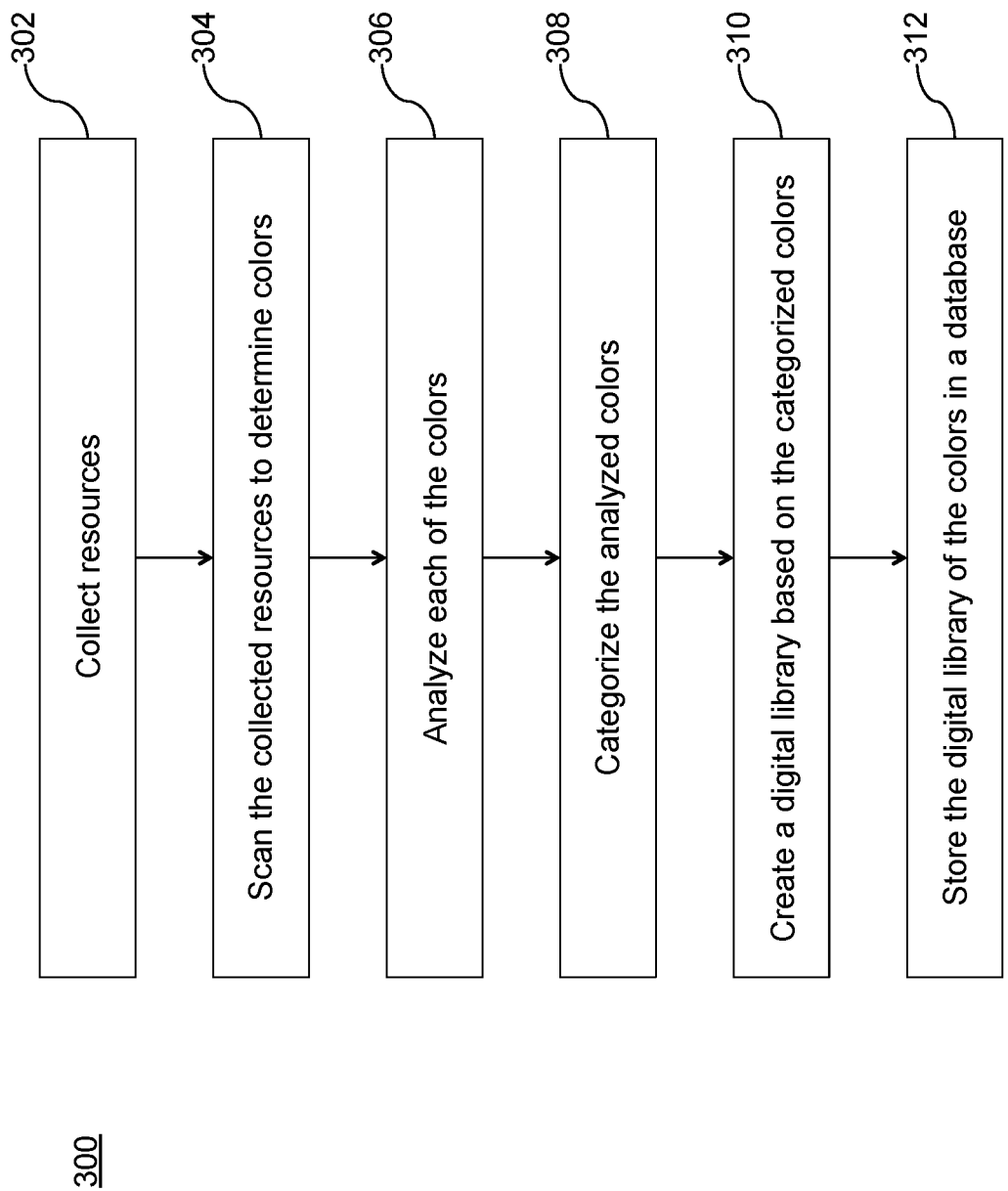
FIG. 3 depicts a flowchart of a method for creating a digital color library, according to an embodiment of the present invention.

FIG. 3 depicts a flowchart of a method 300 for creating a digital color library, according to an embodiment of the present invention. At step 302, the color coding system 100 may collect resources for scanning colors. As discussed above, the resources may include, but not limited to, printable media (e.g., seasonal color charts), books, academy training manuals, digital formats, presentations, software applications and websites, advertisings, marketing, drapes, swatches and/or color palettes or libraries from various industries, images, videos, cinematographs, and so forth. In another embodiment of the present invention, the resources may include, but not limited to, hair color samples, skin color samples, eye color samples, and so forth.

At step 304, the color coding system 100 may scan the collected resources to determine color of each sample. In an embodiment of the present invention, the scanning may be done by using a scanning device, such as the scanning device 106, the user device 102, the vendor device 108, and so forth.

At step 306, the color coding system 100 may analyze the scanned colors. The color coding system 100 may analyze the scanned colors and measure values of each of the scanned colors in terms of, but not limited to, RGB, CMYK, HSV, and so forth. Further, the color coding system 100 may generate a data file that comprises measured values of each of the scanned colors. The color coding system 100 may measure values of colors, which may include, but not limited to, Red (RGB) %, Green (RGB) %, Blue (RGB) %, Hue (HSL/HSV) degree, Saturation (HSL) %, Light (HSL) %, Saturation (HSV) %, Value (HSV) %, Chroma, brightness, reflection, absorption, diffusion, and so forth.

In an embodiment of the present invention, the color coding system 100 may be configured to digitally formulate colors by mixing two digital colors color A and color B (additive or subtractive). The outcome of the mixing that is a third color C may then be stored in a database, such as the database 114. In an embodiment of the present invention, the color coding system 100 may calculate a hexadecimal value for the third color C based on hexadecimal values of the color A and the color B.

Furthermore, the color coding system 100 may assign a hexadecimal value to each of the scanned colors according to a hex color code scheme. The hex color code is a way of representing a color using hexadecimal values. The color coding system 100 may assign a label to each of the scanned colors. The label may be assigned in a format, for example, "Name, Index, Label 1 physical set of fabric color", "Name, Index, Label 1 physical set of eye color", "Name, Index, Label 1 physical set of human hair color", and so forth. Also, the color coding system 100 may create a value scale table for each of the scanned colors within hue. The value scale tables may be created based on the measured values of the RGB, CMYK, etc., hexadecimal value, and an assigned label. The above defined steps are performed to digitalize the colors.

At step 308, the color coding system 100 may categorize the analyzed colors. In an embodiment of the present invention, the color coding system 100 may categorize the value scale tables of colors based on seasons. The color coding system 100 may categorize each color into one of the four seasonal categories that may include, spring, summer, autumn, and winter. In an embodiment of the present invention, if a color transitions into another season based on factors such as, but not limited to, undertone, dilution, saturation, shared transitions, universal states, or the like, then the seasonal color coding system 100 may utilize Artificial Intelligence (AI) based algorithms to dynamically update a color palette associated with a season. The AI based algorithms may establish a delineation line of the identified color where the color transition from one season to another season. The color thus identified may also share two or more seasons at the same time. Therefore, the AI based algorithm may evolve the pre-loaded color palettes associated with a season by continuously updating the color palettes associated with each of the seasons in the database 114.

Next, at step 310, the color coding system 100 may create a master digital library based on the categorized colors of the value scale tables. All the value scale tables categorized into seasons are then stored in a master digital library. At step 312, the color coding system 100 may store the master digital library in a database, such as the database 114.

Figure 4:
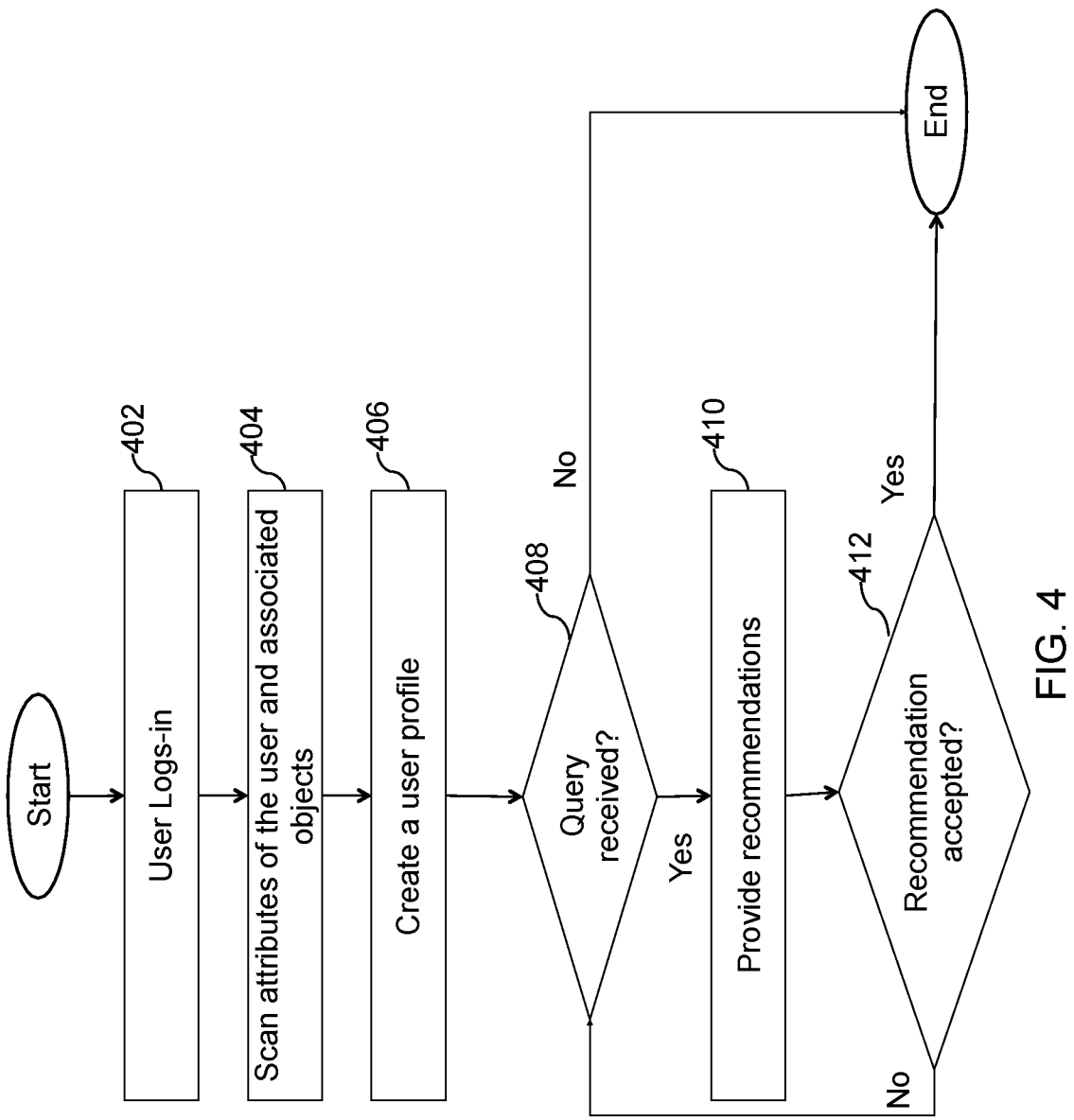
FIG. 4 depicts a flowchart of a method for providing recommendations to a user, according to an embodiment of the present invention.

FIG. 4 depicts a flowchart of a method 400 for providing recommendations for a customized color palette to a user, according to another embodiment of the present invention. At step 402, a user logs-in to the color application 104 using the user device 102. The user may log-in to the color application 104 by using log-in credentials, such as, but not limited to, a sign-in ID and a password, and/or a biometric, for example, a fingerprint, a face recognition, etc. In case, the user is a first time user, then a user interface to sign-up for the color application 104 may be prompted on the user device 102.

At step 404, attributes of the user are scanned. The attributes may include, but not limited to, skin, eyes and hair, clothing or couture accessories, paints, and so forth. In an embodiment of the present invention, a survey having questionnaire may be performed to collect data from the user about, but not limited to, user preferences and so forth. Based on the scanned attributes and surveyed data, a user profile is created, at step 406. In an embodiment of the present invention, a unique identification (ID) may be assigned to the user and the data associated with the user may be linked to the unique ID and is then stored in the database, such as the database 114.

At step 408, it is determined that a user query is received or not. In case, it is determined that a user query is received, then the method 400 proceeds towards a step 410. In case, it is determined that a user query is not received, then the method 400 concludes. The user query may include, but not limited to, a season that belongs to the user, or a color that may belong to the user, a recommendation, and so forth. The color coding system 100 may find a closest match related to the query from the database, such as the database 114.

At the step 410, recommendations are provided to the user based on the query. The recommendation may include, but not limited to, a customized color palette, a tangible object stored in the user's inventory that may be used as per the query of the user, and so forth. In an embodiment of the present invention, one or more web addresses of one or more shopping websites are also provided to the user, in case, the user desires to buy a new object based on the query. In another embodiment of the present invention, a weblink to a personal palette makeup may also be provided to the user.

At step 412, it is determined that the recommended color palettes are accepted by the user. In case, the recommended customized color palettes are accepted by the user, then the method 400 concludes. In case, the recommended customized color palettes are not accepted by the user, then the method 400 returns to the step 408 and may receive additional query from the user. Based on the additional query, the method 400 continues to provide recommendations to the user.

Figure 5:
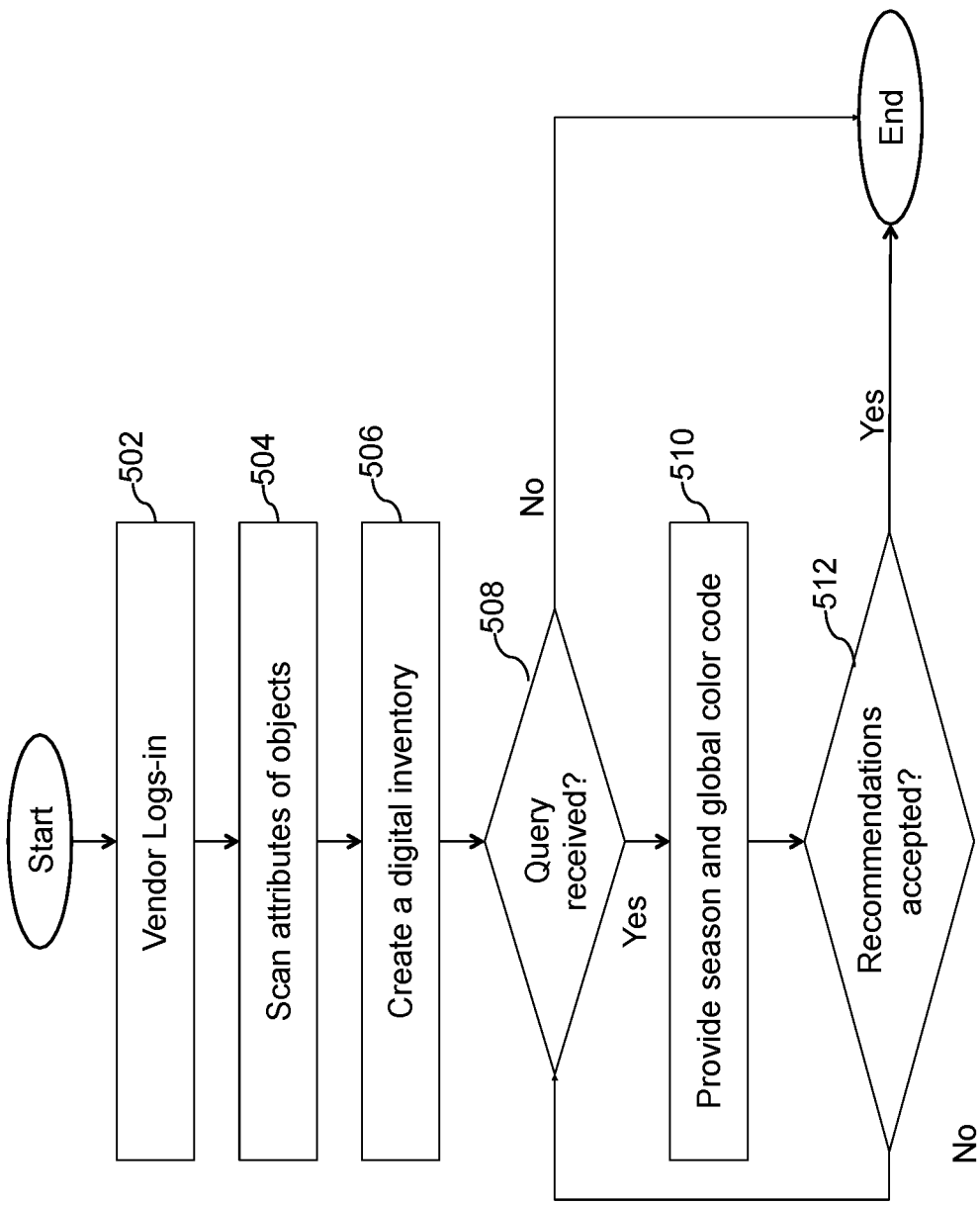
FIG. 5 depicts a flowchart of a method for creating a vendor's digital library of objects at a backend operation, according to an embodiment of the present invention.

FIG. 5 depicts a flowchart of a method 500 for creating a vendor's digital library of objects at backend operation, according to another embodiment of the present invention.

At step 502, a vendor logs-in to the color application 104. The vendor may log-in to the color application 104 by using log-in credentials, such as, but not limited to, a sign-in ID and a password, and/or a biometric, for example, a fingerprint, a face recognition, etc.

At step 504, the vendor may scan the objects in the inventory. The scanning of the objects may be performed by using the scanning device 106, or the vendor device 108. While scanning the objects, the scanning device 106 may scan attributes of the objects, which may include, but not limited to, a color, a type of the object, a pricing of the objects, barcodes and so forth. At step 506, a digital inventory for the objects with their seasonal color is managed.

At step 508, it is determined that a query from a vendor is received or not. In case, a query from the vendor is received then the method 500 proceeds towards a step 510. In case, it is determined that no query is received from the vendor, then the method 500 concludes. In an embodiment of the present invention, the query may include data about an object required by the vendor.

At step 510, based on the query, the color coding system 100 may provide season and global color code for the queried objects.

At step 512, it is determined that the recommended season and global color code is accepted by the vendor or not. In case, the recommendation is accepted by the vendor, then the method 500 concludes. In case, the recommendation is not accepted by the vendor, then the method 500 returns to the step 508 and may receive additional query from the vendor. Based on the additional query, the method 500 continues to provide recommendations to the vendor.

Figure 6:
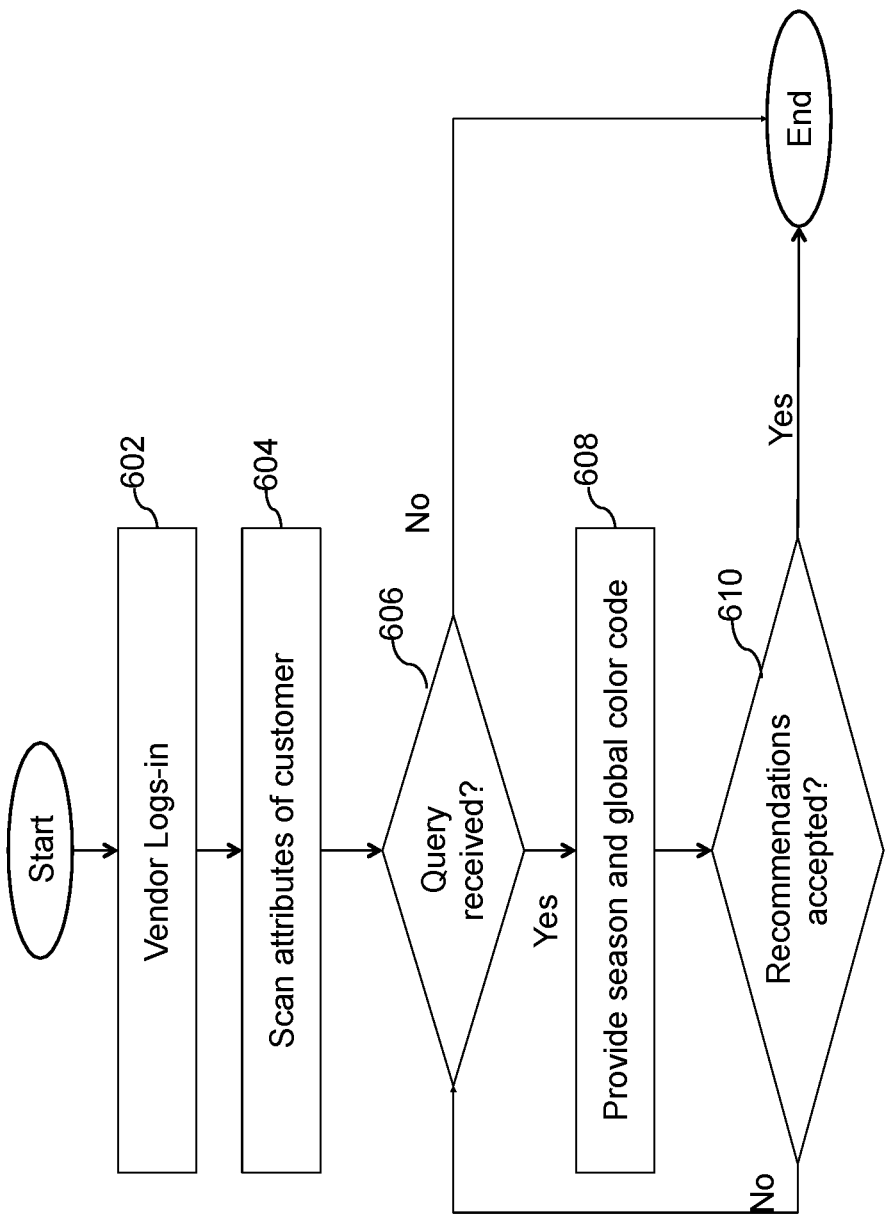
FIG. 6 depicts a flowchart of a method for providing a customized personal palette to a consumer, according to an embodiment of the present invention.

FIG. 6 depicts a flowchart of a method 600 for providing a customized personal palette to a consumer, according to another embodiment of the present invention.

At step 602, a vendor logs-in to the color application 104. The vendor may log-in to the color application 104 by using log-in credentials, such as, but not limited to, a sign-in ID and a password, and/or a biometric, for example, a fingerprint, a face recognition, etc.

At step 604, the vendor may scan the attributes of the customer. The scanning of the attributes may be performed by using the scanning device 106, or the vendor device 108. The attributes of the consumer may include, but not limited to, a skin, a hair, an eye, and so forth.

At step 606, it is determined that a query from a vendor is received or not. In case, a query from the vendor is received then the method 600 proceeds towards a step 608. In case, it is determined that no query is received from the vendor, then the method 600 concludes. In an embodiment of the present invention, the query may include data about an object required by the consumer. Also, the query may be entered by the customer.

At step 608, based on the query and scanned attributes of the consumer, the color coding system 100 may provide recommendations of customized color palettes including one or a combination of a temperature, a season and/or a global color code.

At step 610, it is determined that the recommendation is accepted by the consumer or not. In case, the recommendation is accepted by the consumer, then the method 600 concludes. In case, the recommendation is not accepted by the consumer, then the method 600 returns to the step 606 and may receive additional query from the vendor. Based on the additional query, the method 600 continues to provide recommendations to the vendor.

Figure 7:
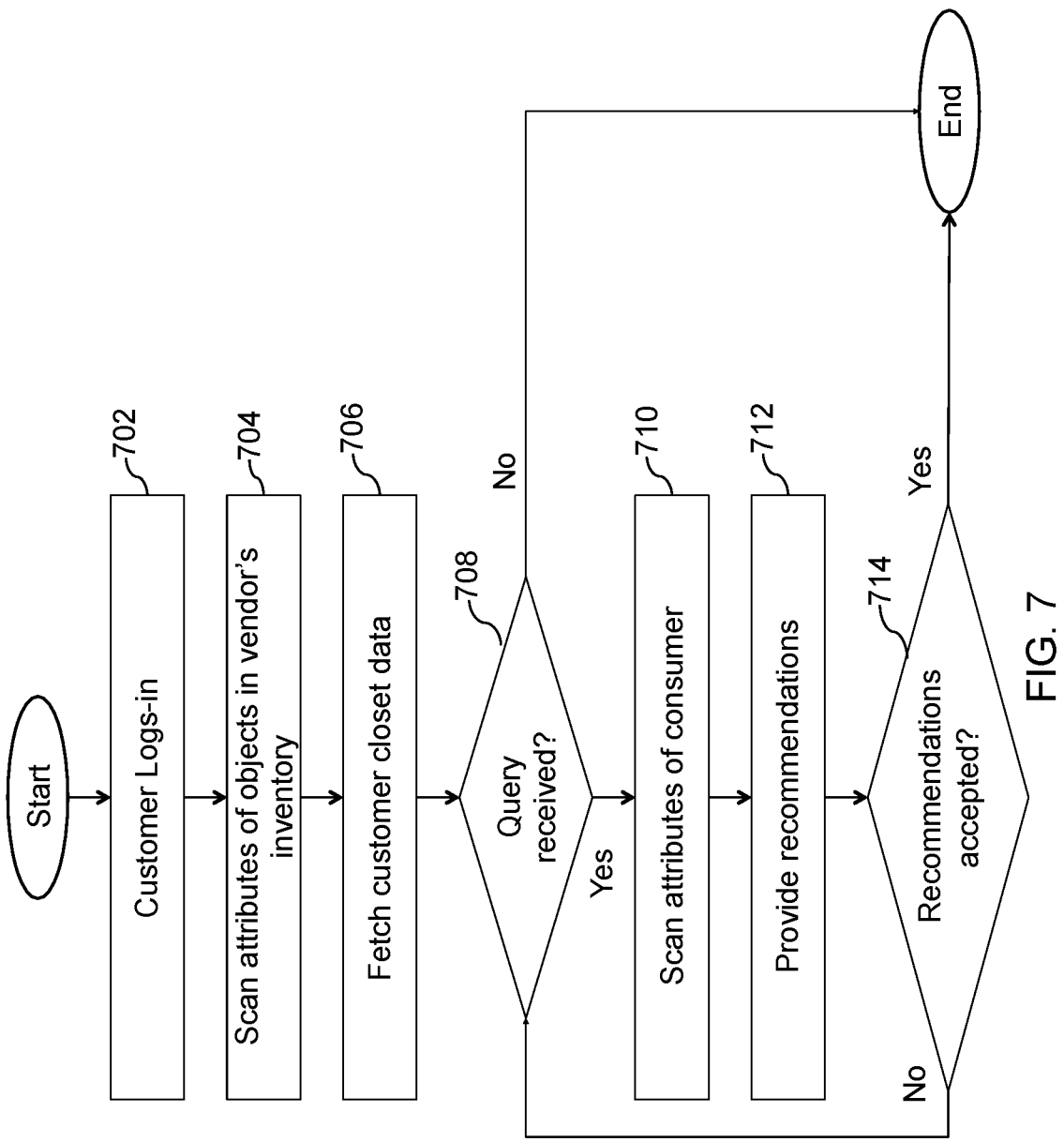
FIG. 7 depicts a flowchart of a method for creating a providing recommendations to a consumer, according to an embodiment of the present invention.

FIG. 7 depicts a flowchart of a method 700 for providing recommendations to a consumer, according to another embodiment of the present invention.

At step 702, a customer logs-in to the color application 104. The customer may log-in to the color application 104 by using log-in credentials, such as, but not limited to, a sign-in ID and a password, and/or a biometric, for example, a fingerprint, a face recognition, etc.

At step 704, the customer may scan the objects in the inventory. The scanning of the objects may be performed by using the scanning device 106, or the vendor device 108. While scanning the objects, the scanning device 106 may scan attributes of the objects, which may include, but not limited to, a color, a type of the object, a pricing of the objects, and so forth. At step 706, customer closet data is fetched from the database 114.

At step 708, it is determined that a query from a vendor is received or not. In case, a query from the vendor is received then the method 700 proceeds towards a step 710. In case, it is determined that no query is received from the vendor, then the method 700 concludes. In an embodiment of the present invention, the query may include data about an object required by the customer. Also, the query may be entered by the customer.

At step 710, attributes of a consumer are scanned. The attributes of the consumer may include, but not limited to, a skin, a hair, an eye, and so forth. In case, the vendor requires additional input or query from the customer for providing advanced recommendation beyond season or global color code, then one or more web addresses, for example, but not limited to, links to internal inventory or external shopping resources are provided to the customer. Also, at step 710, attributes of a customer may also be fetched from the server database or file already stored in phone.

At step 712, based on the query and scanned attributes of the consumer, the color coding system 100 may provide recommendations. In an embodiment of the present invention, the color coding system 100 may provide recommendations to the customer about objects stored in the customer's closet or inventory of the vendor based on the recommended color and/or season.

At step 714, it is determined that the recommendation is accepted by the consumer or not. In case, the recommendation is accepted by the consumer, then the method 700 concludes. In case, the recommendation is not accepted by the consumer, then the method 700 returns to the step 708 and may receive additional query from the vendor. Based on the additional query, the method 700 continues to provide recommendations to the customer.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

The exemplary embodiments of this present invention have been described in relation to color coding systems. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A seasonal color coding system for recommending at least one customized season color harmony palette to at least one user, the season color coding system comprising:

a scanning module configured to scan a plurality of attributes comprising a skin color, a hair color, and an eye color, a plurality of colors of one or more tangible subjects from a plurality of resources, or a combination thereof, associated with the at least one user;

one or more databases configured to store the plurality of scanned attributes associated with the at least one user;

an analysis module configured to analyze the plurality of attributes by using one or more mathematical algorithms to identify one or more colors from a color palette corresponding to each of the plurality of the attributes, wherein the identification of one or more colors comprising:

comparing the color of the plurality of scanned attributes with the color palette stored in the one or more databases; and selecting the one or more colors from the one or more databases based on the comparison, wherein:

the one or more databases are updated when a new color is identified;

a categorization module configured to determine at least one category for the at least one user based on the identification of the one or more colors corresponding to each of the plurality of the attributes;

a recommendation module configured to provide one or more recommendations for the at least one customized season color harmony palette to the at least one user based on the determined category; and a display module configured to display the customized season color harmony palette to the at least one user.

2. The system of claim 1, further comprising a survey module configured to conduct one or more surveys from the at least one user.

3. The system of claim 1, wherein the analysis module is further configured to identify a new color based on a media colors rendered in a predetermined media.

4. The system of claim 1, wherein the analysis module is further configured to assign at least one of a hexadecimal value and a measured value to each of the scanned colors.

5. The system of claim 1, wherein the analysis module is further configured to create at least one value scale table for each color within hue.

6. The system of claim 5, wherein each of the at least one value scale table associated with each color is stored in the one or more databases to create at least one digital color library.

7. The system of claim 1, wherein the category comprises at least one season, at least one seasonal color, at least one seasonal harmony, or a combination thereof associated with the at least one user.

8. The system of claim 1, wherein the recommendation module is further configured to recommend at least web address for at least one of a shopping websites and a resource website.

9. The system of claim 1, further comprising a print module configured to print the at least one recommended customized season color harmony palette.

10. A computer-implemented method for recommending at least one customized season color harmony palette to at least one user, the method comprising:

scanning a plurality of attributes comprising a skin color, a hair color, and an eye color, a plurality of colors of one or more tangible subjects from a plurality of resources, or a combination thereof associated with the at least one user;

storing the plurality of scanned attributes associated with the at least one user;

analyzing the plurality of attributes by using one or more mathematical algorithms to identify one or more colors from a color palette corresponding to each of the plurality of the attributes, wherein the identification of one or more colors comprising:

comparing the color of the scanned plurality of physical attributes with the color palette in the one or more databases; and selecting the one or more colors from the one or more databases based on the comparison, wherein updating the one or more databases when a new color is identified;

determining at least one category for the at least one user based on the identification of the one or more colors corresponding to each of the plurality of the attributes;

providing one or more recommendations for the at least one customized season color harmony palette to the at least one user based on the determined category; and displaying the customized season color harmony palette to the at least one user.

11. The method of claim 10, further comprising conducting one or more surveys from the at least one user.

12. The method of claim 10, wherein the new color is identified based on a media colors rendered in a predetermined media.

13. The method of claim 10, further comprising assigning at least one of a hexadecimal value and a measured value to each of the scanned colors.

14. The method of claim 10, further comprising creating at least one value scale table for each color within hue.

15. The method of claim 10, further comprising recommending at least web address for at least one of a shopping websites and a resource website.

16. The method of claim 10, further comprising printing the at least one recommended customized season color harmony palette.

17. A computer-implemented method for recommending at least one customized season color harmony palette to at least one user, the method comprising:

scanning a plurality of attributes comprising a skin color, a hair color, and an eye color, a plurality of colors of one or more tangible subjects from a plurality of resources, or a combination thereof associated with the at least one user;

store the plurality of scanned attributes associated with the at least one user;

analyzing the plurality of attributes by using one or more mathematical algorithms to identify one or more colors from a color palette corresponding to each of the plurality of the attributes, wherein the identification of one or more colors comprising:

comparing the color of the scanned plurality of attributes with the color palette in the one or more databases; and selecting the one or more colors from the one or more databases based on the comparison, wherein:

updating the one or more databases when a new color is identified based on at least one of a RGB value, a CMYK value, a HSV, or a combination thereof;

determining at least one category for the at least one user based on the identification of the one or more colors corresponding to each of the plurality of the attributes;

providing one or more recommendations for the at least one customized season color harmony palette to the at least one user based on the determined category; and displaying the customized season color harmony palette to the at least one user.

18. The method of claim 17, further comprising assigning at least one hexadecimal value or other value to each of the scanned colors.

19. The method of claim 17, further comprising printing the at least one recommended customized season color harmony palette.

20. The method of claim 17, further comprising recommending at least web address for at least one of a shopping websites and a resource website.

* * * * *